UNITED STATES PATENT OFFICE.

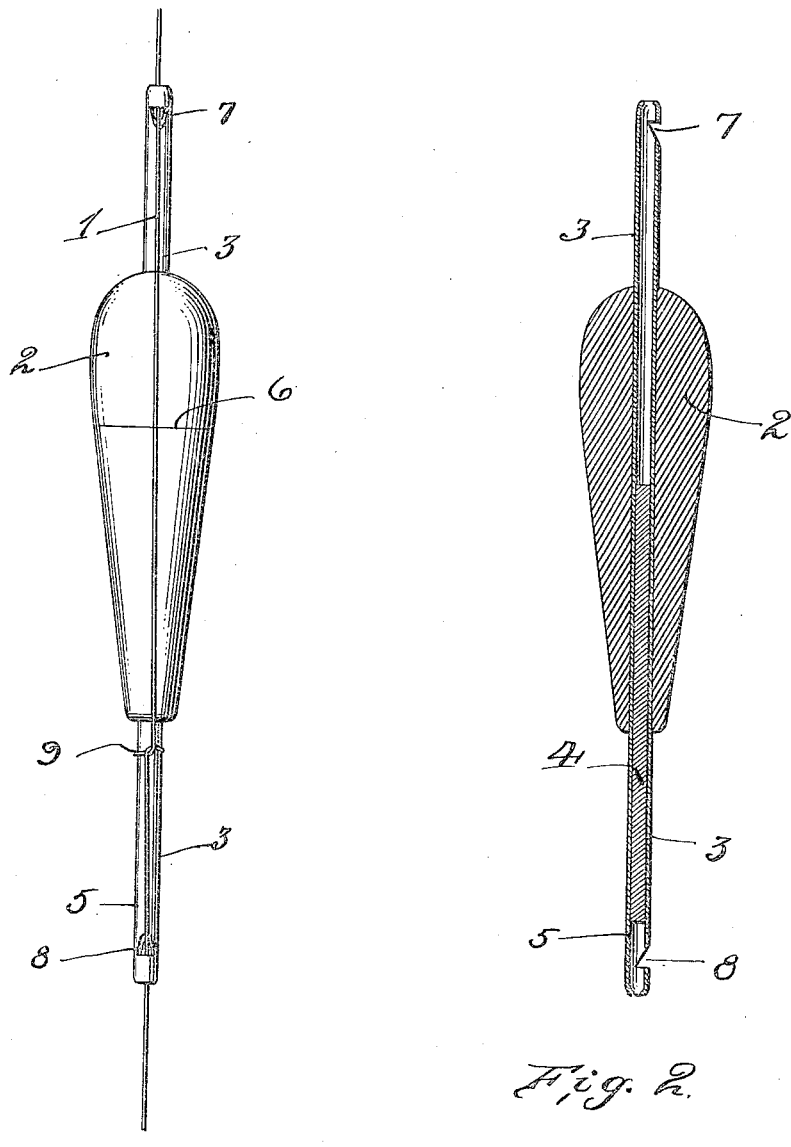

LOUIS W. LORY, OF MADISON, INDIANA.

FISHING-LINE FLOAT.

1,126,045. Specification of Letters Patent. Patented Jan. 26, 1915.

Application filed February 19, 1914. Serial No. 819,798.

*To all whom it may concern:*

Be it known that I, LOUIS W. LORY, a citizen of the United States, residing at Madison, in the county of Jefferson and State of Indiana, have invented certain new and useful Improvements in Fishing-Line Floats, of which the following is a specification.

My invention relates to floats or so called "bobbers" adapted for use upon fishing lines and has for its object the provision of a novel form of float comprising a minimum number of parts all of which are stationary and which is so constructed that the weight within itself is sufficient to maintain it in an upright position in the water at the proper level entirely without the necessity of using the usual "sinker" or weight.

An important object is to provide a device of this character which will not rust or otherwise corrode as a result of its immersion in water, and which may be readily and quickly adjusted upon the fishing line.

Other objects and advantages such as extreme simplicity, cheapness, efficiency and durability will be brought out in the following description, pointed out in the claims and illustrated in the accompanying drawings, in which:

Figure 1 is a side elevation of my improved float connected with a fishing line, and Fig. 2 is a vertical sectional view therethrough on a line at right angles to the plane of Fig. 1.

Referring more particularly to the drawings, the numeral 1 designates a fishing line upon which my improved float is adapted to be secured.

My float comprises a body portion 2 of buoyant material, preferably cork, and of any desired shape such as egg or barrel shape. Extending centrally through the body portion 2 is a tube 3 formed preferably of aluminum which forms the stem or support for the float. The tube 3 is filled with weighting material 4 such as lead, from a point somewhat above its lower end 5 to a point approximately at its center. The amount of this weighting material is gaged so that the float will when placed in the water be submerged to about the line 6 which is the line of demarcation between the contrasting colors of the upper and lower portions of the body portion 2 as is customary.

In order to secure the float upon the fishing line, I provide notches 7 and 8 in the wall of the tube 3 adjacent its upper and lower ends respectively. The line 1 is passed downwardly through the upper end of the tube 3, then out through the notch 7, after which it is made to form a half hitch 9 around the tube 3; it is then passed through the notch 7 in the lower end of the tube 3, and then out through said lower end. It will be readily understood that the half hitch 9 may be loosened at any time so that the length of line below the float may be regulated for deep or shallow fishing as desired. The advantages of this form of device are as follows: The tubular stem 3 being formed of aluminum can not corrode from immersion in water and being formed of one continuous tube can not become separated. When the float is properly secured upon the line 1 it is substantially weedless as there are no knots or the like, merely the half hitch 9.

Owing to the fact that the float itself is weighted it is not necessary to employ the usual "sinker" to hold the float in the proper upright position though a sinker can be used in addition if desired.

My improved float is especially desirable for use when live minnows are used for bait for the reason that owing to the fact that no sinker is needed the minnow may play upon the entire length of the line 1 between the hook and the body portion 2, thus allowing the minnow to live for a longer time than is possible with the usual float and a sinker about six inches from the hook.

Having thus described my invention what I claim is:

1. A fishing float comprising a tubular non-corrosive stem adapted to be secured upon a line, weighting material within said tubular stem, and extending to a point substantially adjacent the lower end thereof, and a buoyant body portion disposed on said stem.

2. A fishing float comprising a tubular non-corrosive metallic stem provided with notches in its wall adjacent each end for the passage of a line, a weight within said tubular stem and extending to substantially the lower end thereof, and a buoyant body portion disposed upon said stem.

3. A fishing float comprising a hollow stem weighted from a point approximately at its center to substantially the lower end thereof, said stem being provided with notches in its sides adjacent its ends for connection with a line, and a buoyant body portion disposed on said stem.

In testimony whereof I hereto affix my signature in the presence of two witnesses.

LOUIS W. LORY.

Witnesses:
SOLOMON J. BEER,
GEO. C. GERTZ.

Copies of this patent may be obtained for five cents each, by addressing the "Commissioner of Patents, Washington, D. C."